United States Patent
Tchistiakov et al.

(10) Patent No.: US 7,288,682 B2
(45) Date of Patent: Oct. 30, 2007

(54) SEPARATION OF BIFUNCTIONAL PERFLUOROPOLYETHERS (PFPES) HAVING -CH$_2$OH TERMINATION FROM THEIR MIXTURES WITH -CH$_2$OH MONOFUNCTIONAL PFPES

(75) Inventors: Alexandre Tchistiakov, Milan (IT); Simonetta Fontana, Milan (IT); Claudio Tonelli, Milan (IT)

(73) Assignee: Solvay Solexis S.p.A., Milan (IT)

( * ) Notice: Subject to any disclaimer, the term of this patent is extended or adjusted under 35 U.S.C. 154(b) by 228 days.

(21) Appl. No.: 11/176,218

(22) Filed: Jul. 8, 2005

(65) Prior Publication Data

US 2006/0009660 A1   Jan. 12, 2006

(30) Foreign Application Priority Data

Jul. 9, 2004   (IT)   ............... MI2004A1370

(51) Int. Cl.
  *C07C 41/03*   (2006.01)
(52) U.S. Cl. ............... 568/677; 568/615; 568/621; 568/682; 568/683; 568/684
(58) Field of Classification Search ............... 568/615, 568/621, 682, 683, 684
See application file for complete search history.

(56) References Cited

U.S. PATENT DOCUMENTS

| | | | |
|---|---|---|---|
| 3,544,537 A | 12/1970 | Brace | |
| 3,665,041 A | 5/1972 | Sianesi et al. | |
| 3,715,378 A | 2/1973 | Sianesi et al. | |
| 3,766,251 A | 10/1973 | Caporiccio et al. | |
| 3,810,874 A | 5/1974 | Mitsch et al. | |
| 3,847,978 A | 11/1974 | Sianesi et al. | |
| 4,647,413 A | 3/1987 | Savu | |
| 4,814,372 A | 3/1989 | Caporiccio et al. | |
| 5,246,588 A | 9/1993 | Tonelli et al. | |
| 5,262,057 A | 11/1993 | Tonelli et al. | |
| 5,714,637 A | 2/1998 | Marchionni et al. | |
| 5,910,614 A | 6/1999 | Turri et al. | |
| 6,509,509 B2 | 1/2003 | Tonelli et al. | |
| 6,573,411 B2 | 6/2003 | Russo et al. | |

FOREIGN PATENT DOCUMENTS

| | | |
|---|---|---|
| EP | 0 148 482 A2 | 7/1985 |
| EP | 0 151 877 A2 | 8/1985 |
| EP | 0 239 123 A2 | 9/1987 |
| EP | 0 528 827 A2 | 4/1993 |
| EP | 0 528 827 A3 | 4/1993 |
| EP | 0 538 827 A | 4/1993 |
| EP | 0 538 828 A | 4/1993 |
| EP | 0 538 828 A2 | 4/1993 |
| EP | 0 822 216 A | 2/1998 |
| EP | 0 822 216 A2 | 2/1998 |
| EP | 0 822 216 A3 | 2/1998 |

*Primary Examiner*—Rosalynd Keys
(74) *Attorney, Agent, or Firm*—Arent Fox LLP

(57) ABSTRACT

A process for separating bifunctional perfluoropolyethers (PFPEs) having two terminations —CH$_2$OH from their mixtures with monofunctional PFPEs with one termination —CH$_2$OH, of general formula $$X_1\text{—O—Rf—Y} \qquad (I)$$

wherein Rf is a perfluoropolyoxyalkylene chain having a number average molecular weight of 500-10,000; $X_1$ and Y are end groups selected from —CFXCH$_2$OH (wherein X is F or CF$_3$), —CF$_3$, —CF$_2$Cl, —CF$_2$CF$_2$Cl, —C$_3$F$_6$Cl, —CF$_2$Br, —CF$_2$CF$_3$, wherein at least one of the two end groups is —CFXCH$_2$OH, said process comprising the steps of:
a) addition of the PFPE mixture to an adsorbing solid phase, under stirring;
b) filtration of the mixture obtained in a):
c) addition to the solid phase filtered in b), of a PFPE mixture having an average functionality higher than that of the PFPE mixture of the liquid filtered in b);
c2) filtration of the mixture obtained in c); and subsequent treatment of the solid phase separated in c2) with a polar solvent obtaining a liquid containing the PFPE having high functionality.

16 Claims, No Drawings

SEPARATION OF BIFUNCTIONAL PERFLUOROPOLYETHERS (PFPES) HAVING -CH₂OH TERMINATION FROM THEIR MIXTURES WITH -CH₂OH MONOFUNCTIONAL PFPES

The present invention relates to a process to separate bifunctional perfluoropolyethers (PFPEs) having a methylol —CH$_2$OH end group from their mixtures with monofunctional perfluoropolyethers having an end group equal to the above one, optionally containing perfluoropolyethers with non functionalized end groups.

Said perfluoropolyethers, in particular their mixtures, which can comprise molecules with non functionalized end groups, are known and described in patents U.S. Pat. Nos. 6,573,411; 6,509,509; 5,714,637; 4,814,372; 4,647,413; 3,847,978; 3,810,874; 3,766,251; 3,715,378; 3,665,041; 3,544,537; and EP 239,123, 148,482 and 151,877.

These PFPEs have the following formula

$$X_1\text{—}O\text{—}Rf\text{—}Y \quad (I)$$

wherein:
Rf is a perfluoropolyoxyalkylene chain having a number average molecular weight 500-10,000 comprising units of (C$_2$F$_4$O), (CF$_2$O), (C$_3$F$_6$O) type, the unit (C$_3$F$_6$O) can represent units of formula —(CF$_2$CF(CF$_3$)O) or (CF(CF$_3$)CF$_2$O)—; (CF$_2$(CF$_2$)$_z$CF$_2$O)— wherein z is an integer 1 or 2; —CR$_4$R$_5$CF$_2$CF$_2$O— wherein R$_4$ and R$_5$ are equal to or different from each other and selected among H, Cl or perfluoroalkyl, for example having 1-4 carbon atoms, said units being statistically distributed along the backbone;

X$_1$ and Y are end groups selected from —CFXCH$_2$OH (wherein X is F or CF$_3$), —CF$_3$, —CF$_2$Cl, —CF$_2$CF$_2$Cl, —C$_3$F$_6$Cl, —CF$_2$Br, —CF$_2$CF$_3$.

The PFPE mixture (I), due to the preparation method employed, comprises monofunctional and bifunctional perfluoropolyethers (—CH$_2$OH functionality), and also molecules functional end group free.

The industrial processes known for the production of these perfluoropolyether mixtures, and described in the above patent, depending on the used experimental conditions, the monomer choice and their ratio, mainly bring to the obtainment of two distinct mixtures characterized by a number average functionality between 0.80 and 1.20, or between 1.80 and 1.95.

The average functionality is generally defined as the number of end group methylols per molecule and can be determined by $^{19}$F NMR analysis (see the characterization in the Examples).

Perfluoropolyethers having a functionality up to 2.00 or perfluoropolyethers with a functionality up to 1.00 can be isolated from said mixtures by using suitable separation methods, for example by an adsorption and desorption process on a suitable stationary phase.

However the above mentioned limit values (2.00 and 1.00) are obtainable only with an extremely reduced productivity (lower than 0.26), expressed in kg of isolated product/kg of stationary phase. Furthermore it is necessary to use as starting mixture to be separated, a mixture sufficiently rich in the species which one wants to obtain pure. For example, if it is desired to obtain bifunctional species, the starting mixture must have an average functionality of 1.90-1.95 (90-95% of bifunctional species). Likewise if one wants to recover monofunctional species, the starting mixtures must have an average functionality of about 0.8 (80% of monofunctional species).

A process for obtaining the separation of bifunctional perfluoropolyethers from monofunctional perfluoropolyethers, optionally in the presence of molecules having non functionalized end groups, requires the use of chromatography on column using as adsorbing stationary phase for example silica gel. See U.S. Pat. Nos. 5,262,057 and 5,246,588. However this method shows the following drawbacks:

it requires high amounts of eluent solvents and the obtained product contains very diluted perfluoropolyether (about 3-5 g per liter).

the separation column must have a remarkable length with respect to the diameter to allow a good separtion of the species having a different functionality.

Therefore to separate industrial amounts of perfluoropolyethers (10-100 Kg) it is necessary to use numerous parallel chromatographic columns, and to proceed to the separation of remarkable amounts of solvent. This brings to a complex and expensive industrial plant.

Furthermore the productivity in the separated bifunctional (or monofunctional) product, expressed in kg of separated product per kg of adsorbing stationary phase (silica gel) is very low (about 0.26). It is therefore difficult to have available a simple, a not expensive and with a high productivity industrial plant by using the above process. This is due to the remarkable volumes of solvents which must be treated and recovered, the high amount of stationary phase (silica gel), as well as the increased costs for the use of many parallel chromatographic columns.

Another method to obtain the separation of bifunctional perfluoropolyethers from monofunctional perfluoropolyethers is described in U.S. Pat. No. 5,910,614 and comprises the following steps:

1) addition of the mixture to be separated to a suspension of an adsorbing solid phase, preferably a powder silica gel wherein the mixture/adsorbing solid phase ratio ranges from 0.66 to 1 w/w, in a polar solvent, optionally in admixture with a fluorinated solvent having a low polarity, wherein the solvent/(adsorbing solid phase+perfluoropolyether mixture) ratio ranges from 0.8 to 1.5 w/w), then evaporation of the solvent(s) until obtaining a fine powder containing adsorbed the perfluoropolyether (i.e. adsorbing solid phase+perfluoropolyether);

2) treatment of said fine powder with a fluorinated a polar solvent, for example CFC 113, to extract a perfluoropolyether mixture rich in monofunctional molecules (in general 1.5-4 liters of solvent/Kg of fed adsorbing solid phase are used);

3) treatment of the powder, obtained in step 2), with a polar solvent to extract a perfluoropolyether mixture rich in bifunctional molecules (in general 1-2 liters of solvent/kg of fed adsorbing solid phase are used).

From the so obtained extract the bifunctional perfluoropolyethers are separated by evaporating the polar solvent. However to obtain perfluoropolyethers having a functionality higher than 1.900 up to 1.996 it is necessary to use starting perfluoropolyether mixtures having a functionality equal to or higher than 1.900. Besides it is not possible to obtain monofunctional perfluoropolyethers in relevant amounts.

The productivity, expressed in kg of separated product per kg of silica gel, is improved compared with that of the 2 above patents relating to the process on chromatographic column. The productivity is at maximum 0.52 with respect to one of 0.26. However it would be desirable to have available a process having improved productivity.

The need was therefore felt to have available a simple, economic, industrially feasible process capable to treat large amounts of perfluoropolyethers with improved productivity.

There was also the need to have available a process, independently from the number average functionality of the starting perfluoropolyether mixture, allowing to separate with high efficiency and improved productivity the two fractions of the mixture, i.e. the monofunctional from the bifunctional molecules and industrially feasible without excessive costs.

In particular the need was felt to have available a process capable to separate perfluoropolyether mixtures having a methylol functionality, with a number average functionality comprised in a wide range, generally 0.80-1.96 and operating also without solvent(s) and therefore environmental friendly.

In other words the need was particularly felt to have available a separation process of the methylol ended perfluoropolyether mixtures combining a high separation efficacy with an improved productivity (expressed as kg of product per kg of stationary phase) in comparison with the separation processes of the prior art, allowing the use of starting mixtures of any methylol functionality, without the need to use starting mixtures having a precise range of average functionality values as required by the prior art processes (0.80-1.20 according to U.S. Pat. No. 5,246,588 or 1.80-1.95 according to U.S. Pat. Nos. 5,262,057 and 5,910, 614).

The Applicant has surprisingly and unexpectedly found a process solving the above technical problems and allowing to overcome the prior art drawbacks.

An object of the present invention is therefore a process for separating bifunctional perfluoropolyethers having two methylol terminations —$CH_2OH$ from their mixtures with monofunctional perfluoropolyethers with one methylol termination —$CH_2OH$, optionally containing perfluoropolyethers with non functionalized end groups, having general formula $$X_1\text{—O—Rf—Y} \tag{I}$$

wherein:

Rf is a perfluoropolyoxyalkylene chain having a number average molecular weight of 500-10,000 comprising units of $(C_2F_4O)$, $(CF_2O)$, $(C_3F_6O)$ type, the unit $(C_3F_6O)$ can represent units of formula —$(CF_2CF(CF_3)O)$ or —$(CF(CF_3)CF_2O)$; —$(CF_2(CF_2)_zCF_2O)$ wherein z is an integer equal to 1 or 2; —$CR_4R_5CF_2CF_2O$— wherein $R_4$ and $R_5$ are equal to or different from each other and selected from H, Cl or perfluoroalkyl, for example alkyl having 1-4 carbon atoms, said units being statistically distributed along the chain;

$X_1$ and Y are end groups selected from —$CFXCH_2OH$ (wherein X is F or $CF_3$), —$CF_3$, —$CF_2Cl$, —$CF_2CF_2Cl$, —$C_3F_6Cl$, —$CF_2Br$, —$CF_2CF_3$, wherein at least one of the two end gorups is —$CFXCH_2OH$, comprising the following steps:

a) addition of the perfluoropolyether mixture to an adsorbing solid phase, optionally dispersed in an a polar solvent, contained in a reactor equipped with stirring, with a mixture/solid phase ratio from 0.1 to 10 w/w, preferably 0.5-2, more preferably 0.9-1, stirring for a time comprised between 15 minutes and 6 hours, preferably between 1 and 5 hours, more preferably between 2 and 4 hours, at a temperature between 10° and 150° C., preferably between 10° and 30° C.;

b) filtration of the mixture obtained in step a), with separation of a solid phase containing adsorbed a perfluoropolyether mixture enriched in bifunctional perfluoropolyethers and a liquid containing a perfluoropolyether mixture having diminished bifunctional species;

c) addition to the solid phase obtained in b), of a perfluoropolyether mixture having an average functionality higher than that of the perfluoropolyether mixture of the liquid obtained in b), in a mixture/solid phase ratio between 0.1 and 2 w/w, preferably 0.2 w/w, optionally together with an a polar solvent, stirring for a time between 15 minutes and 6 hours, preferably between 1 and 5 hours, more preferably between 2 and 4 hours, at a temperature between 10° and 150° C., preferably between 10° and 30° C.;

c1) optional repetitions of the operations of steps b) and c), until reaching the desired high functionality of the adsorbed perfluoropolyether;

c2) filtration to separate the adsorbing solid phase from the liquid;

d) addition to the solid phase separated in c2) containing adsorbed the perfluoropolyether having the desired high functionality, of a polar solvent in an amount of 1-10 w/w, preferably 4-8 w/w, more preferably 6, stirring at 5°-150° C., preferably 10°-30° C., preferably for about two hours;

e) filtration of the mixture obtained in step d) with separation of a liquid containing the perfluoropolyether having the desired high functionality which is then isolated from the solvent, preferably by distillation.

The perfluoropolyether chain Rf preferably contains the following repeating units:

(A)

wherein X is F or $CF_3$; a and b are integers such that the number average molecular weight is in the above range; a/b is between 10 and 100; or the repeating units in (A) can be linked as follows
—$(CF_2CF(CF_3)O)_a(CFXO)_b$—$CF_2(R'f)CF_2$—O—$(CF_2CF(CF_3)O)_a(CFXO)_b$— wherein R'f is a fluoroalkylene group from 1 to 4 C atoms;

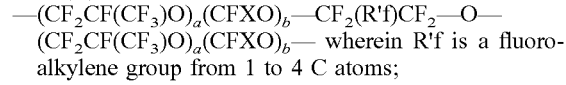

(B)

wherein c, d and h are integers such that the number average molecular weight is in the above range; c/d is between 0.1 and 10; h/(c+d) is between 0 and 0.05, z is 2 or 3; h can also be equal to 0;

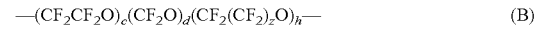

(C)

wherein X is F or $CF_3$; e, f, g are integers such that the number average molecular weight is in the above range; e/(f+g) is between 0.1 and 10, f/g is between 2 and 10; $(C_3F_6O)$ can represent units of formula —$(CF_2CF(CF_3)O)$;

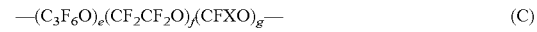

(D)

wherein s is an integer such as to give the above number average molecular weight, z has the already defined meaning;

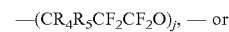 — or

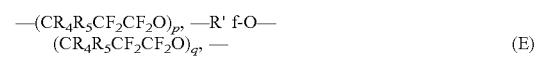

(E)

wherein $R_4$ and $R_5$ are equal to or different from each other and selected from H, Cl or perfluoroakyl from 1 to 4 C atoms; R'f is a perfluoroalkylene group from 1 to 4 C atoms; j', p' and q' are integers such as to have a number average molecular weight as that above;

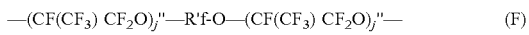   (F)

j" being an integer such as to give the above number average molecular weight; R'f is a fluoroalkylene group from 1 to 4 C atoms.

(A) and (B) are particularly preferred structures.

The perfluoropolyethers containing the repeating units (A)-(F) are obtainable, as said, with the well known processes of the prior art. In particular the functionalized perfluoropolyethers with a methylol termination are for example obtained according to EP 148,482, U.S. Pat. Nos. 3,810,874, 3,544,337, 6,573,411; 6,509,509; 5,714,637; 4,814,372; 4,647,413; 3,847,978; 3,766,251; 3,715,378; 3,665,041; EP 239,123 and EP 151,877. All these patents are herein incorporated by reference.

In step a) the adsorbing solid phase is formed of a compound containing sites and/or active groups, capable to give bonds or interactions of polar type, or hydrogen bonds, with the methylol end groups of the perfluoropolyethers of formula (I) contained in the mixture. Preferably the adsorbing phase contains, as sites or active groups, free hydroxyl groups. The latter groups, in case of the silica gel, are represented by silanol groups.

Examples of preferred compounds as stationary phase for the purposes of the present invention are active alumina, silica gel, magnesium oxide, Al and Mg silicates, such as for example FLORISIL® which preferably show an average pore diameter lower than 200 Å. The silica gel with porosity from 60 to 100 Å, with granulometry from 70-230 mesh to 200-400 mesh corresponding from 0.210-0.063 mm to 0.074-0.037 mm according to ASTM E-11-61, is preferred.

In step a) the optional apolar solvent can be a fluorocarbon or a hydrofluoropolyether, preferably selected from CFC 113, bis-(trifluoromethyl) benzene, H-Galden®, more preferably CFC 113 and the maximum temperature in the step is the boiling temperature of the solvent. The apolar solvent is used in a solvent/solid phase ratio from 0 to 10 w/w, preferably from 2 to 5 w/w, more preferably from 2.5 to 3.5.

In step c) it is preferred to add a perfluoropolyether mixture having a functionality higher than that of the mixture added in a); the apolar solvent, if used, is the same used in step a) and is used in the same ratios indicated in step a) and at the same temperatures.

In step d) the polar solvent is selected from: ketones, esters, alcohols, or their mixtures with lower amounts of a polar solvents, preferably the polar solvent is methanol; the maximum temperature in step d) is the boiling temperature of the solvent or of the mixture.

The process of the present invention is carried out in a simple equipment formed of an only reactor equipped with stirring and a filtration system. In the aforesaid reactor it is possible to treat considerable amounts of perfluoropolyether mixtures having various functionalities as produced by the industrial synthesis.

The process of the invention allows to separate, with high efficiency, from perfluoropolyether mixtures having a methylol functionality, monofunctional species from bifunctional species in particular obtaining bifunctional perfluoropolyethers with an average functionality >1.996 and monofunctional perfluoropolyethers with functionality equal to 1.000.

The process is furthermore characterized by a high productivity. In particular, the productivity, expressed in kg of isolated product/kg of adsorbing solid phase, is at least 300% higher than that of the above known chromatographic processes and 50% higher than that of the process described in U.S. Pat. No. 5,910,614.

Another advantage of this process is represented by the possibility to carry out the separation of monofunctional species from bifunctional species even without using fluorinated solvents.

A further advantage of the process of the present invention is that to be able to obtain a perfluoropolyether with an average functionality higher than 1.996 even starting from mixtures having an average functionality lower than 1.900 (see the comparative Examples).

With the process of the invention, perfluoropolyethers having a high bifunctionality can be obtained, preferably by starting from mixtures having a functionality between higher than 1 and lower than 2, preferably between 1.2 and 1.95, still more preferably between 1.80 and 1.95. As said, the bifunctional perfluoropolyethers are obtained by treating with a polar solvent the solid phase obtained after having carried out all the filtration steps b) and c2). See steps c) and c1).

The liquids separated from each filtration step b), c1) or c2) can be used as perfluoropolyether mixture to be added, for example, in step c) if their functionality satisfies the requirements indicated in c).

Alternatively, the separated liquids obtained from the filtrations b), c1) or c2) can be joined and then the mixture of said liquids is treated to separate in industrial amounts the methylol monofunctional perfluoropolyethers, optionally containing perfluoropolyethers with non functionalized end groups. In this case, the mixture of the aforesaid filtered liquids is treated in a step a1) by adding a fresh adsorbing solid phase, preferably silica. In this way the bifunctional perfluoropolyethers are adsorbed on said solid phase. Step a1) is carried out by letting under stirring until the methylol bifunctional perfluoropolyethers remain adsorbed on the solid.

To said step a1) a filtration step b1) of the mixture obtained in a1) follows, wherein a liquid enriched in monofunctional perfluoropolyethers, optionally containing non functionalized perfluoropolyethers, is separated.

The a1) and b1) operations can optionally be repeated until obtaining a filtered liquid formed of a mixture of monofunctional perfluoropolyethers with a methylol functionality close to 1, optionally containing perfluoropolyethers with non functional terminations. In each new step a1) a fresh adsorbing solid phase and the liquid separated in the previous step b1) are used.

Before the first step a1) all the joined liquids can be partially concentrated to remove the a polar solvent, for example by distillation. This operation has the purpose to increase the productivity, i.e. to reduce the volume of the solvent involved.

The process of the present invention, as said, has been described for separating bifunctional perfluoropolyethers having two methyol terminations —CH$_2$OH from their mixtures with monofunctional perfluoropolyethers having one methyol termination —CH$_2$OH, optionally containing perfluoropolyethers with non functionalized end groups.

The process of the present invention can furthermore be used to separate monofunctional perfluoropolyethers from their mixtures with perlfuoropolyethers having non functionalized end groups, i.e. methylol bifunctional perfluoropolyethers free. In this case the fucntionality of the starting mixture to be used in the starting step a) is between higher than 0 and lower than 1, preferably between 0.3 and 0.95, more preferably between 0.8 and 0.9. In this case from the filtrations of steps b), c1), c2) liquids enriched with non functionalized perfluoropoly-ethers are obtained. In this case the methylol monofunctional perfluoropolyethers remain adsorbed on the silica.

From the above, ternary starting mixtures can therefore be used, containing, in comparable amounts, monofunctional perfuoropolyethers (functionality 1), bifunctional perfluoropolyethers (functionality 2) and non functionalized perfluoropolyethers, and by subjecting said mixtures to the process of the invention, the three components can be quantitatively recovered with a high selectivity and productivity.

In conclusion, the process of the present invention makes available perfluoropolyethers having a methylol functionality corresponding to, or very close to, 1 or 2, which are useful as monomers in the polymer or copolymer synthesis.

The use of perfluoropolyethers having a methylol termination with a functionality of 1 or 2, or very close to these values, is mainly applied in the synthesis of polymeric materials. For example the methylol ended perfluoropolyethers with a functionality very close to two by polyaddition or polycondensation reaction give high molecular weight thermoprocessable polymers. By using monofunctional and bifunctional perfluoropolyether mixtures in preparing polymers or copolymers, the monofunctional perfluoropolyether presence gives polymers containing also fractions of low molecular weight oligomers. These polymers, if used in biomedical applications, can release the oligomeric species due to the action of the physiological liquids determining the pollution of the liquids themselves and therefore risks for the human body. In any case the presence of monofunctional perlfuoropolyethers gives polymers having very poor mechanical properties.

In the synthesis of polyacrylates modified with fluorinated polyether molecules, methylol ended perfluoropolyethers having a functionality close to 1 are electively used as the bifunctional perfluoropolyethers would give crosslinked polymeric chains and the precipitation of a polymeric gel no longer usable to obtain thermoprocessable polymers or for other applications.

Characterization

The values of molecular weight, composition and the hydroxyl functionality of the mixture of compounds of formula (I) wherein the perfluoropolyether chain Rf is the structure (B), are obtained by $^{19}$F-NMR spectroscopy by using a Varian XL-200 spectrometer working at 188.22 MHz.

The $^{19}$F-NMR spectra are obtained on pure samples. The typical acquisition parameters are:

| | |
|---|---|
| spectral width | 25,000 Hz |
| flip angle | 12° |
| acquisition time | 0.5 sec |
| interval among pulses | 0.5 sec |
| number of accumulations | 1,000. |

All the chemical shift values are referred to the group —OCF$_2$CF$_2$CF$_2$CF$_2$O=−125.82 ppm, determined in a separate experiment.

The number average molecular weight Mn is given by the following equation:

$$Mn = 2 \cdot M / (F + I)$$

wherein:

$$M = 66 \cdot [A(I) + A(II) + A(III)] + 116 \cdot [A(IV) + A(V) - A(XVIII)] / 2 +$$
$$166 \cdot [A(IX)] + 216 \cdot [A(VIII)]/2 + 77 \cdot [A(XIV) + A(XV)] / 1.5 +$$
$$93.5 \cdot [A(XVI) + A(XVII)] + 143.5 \cdot [A(XVIII)] +$$
$$89 \cdot [A(X) + A(XI)] + 103 \cdot [A(XIX) + A(XX)]$$

$$F = A(X) + A(XI) + A(XIX) + A(XX)$$

$$I = A(XIV)/1.5 + A(XV)/1.5 + A(XVI) + A(XVII) + A(XVIII)$$

wherein A(i) represents the integrated intensity of the signal corresponding to the "iesimo" assignment of Table 1.

The equivalent weight is given by the following equation:

equivalent weight=M/F wherein M and F have the above meaning.

The end groups XIV, XV, XVI, XVII and XVIII are not functional; since these inert groups are at low concentration, the number of species having both end groups non functional is considered negligible.

The content of bifunctional species is then calculated by the following equation:

% of bifunctional species=[(F−I)/(F+I)]·100.

The average hydroxyl functionality is given by:

functionality=2F/(F+I).

The macromer composition is given as ratio between chain units C$_2$F$_4$O/CF$_2$O.

$$\frac{C_2F_4O}{CF_2O} = \frac{[A(IV) + A(V) - A(XVIII)]}{2 \cdot [A(I) + A(II) + A(III)]}$$

TABLE 1

| | $^{19}$F-NMR Assignments | |
|---|---|---|
| Signal | Chemical Shift | Group |
| I | −52.1 | —OCF$_2$CF$_2$OCF$_2$OCF$_2$CF$_2$O— |
| II | −53.7 | —OCF$_2$CF$_2$OCF$_2$OCF$_2$OCF$_2$— |
| III | −55.4 | —CF$_2$OCF$_2$OCF$_2$OCF$_2$OCF$_2$— |
| IV | −89.1 | —OCF$_2$CF$_2$OCF$_2$CF$_2$OCF$_2$— |
| V | −90.7 | —CF$_2$OCF$_2$OCF$_2$CF$_2$OCF$_2$— |
| VIII | −125.8 | —OCF$_2$CF$_2$CF$_2$CF$_2$O— |
| IX | −129.7 | —OCF$_2$CF$_2$CF$_2$O— |
| X | −81.3 | —OCF$_2$CF$_2$OCF$_2$CH$_2$OH |
| XI | −83.3 | —OCF$_2$OCF$_2$CH$_2$OH |
| XIV | −56.3 | —OCF$_2$OCF$_3$ |
| XV | −58.0 | —OCF$_2$OCF$_3$ |
| XVI | −27.7 | —OCF$_2$CF$_2$OCF$_2$Cl |
| XVII | −29.3 | —OCF$_2$OCF$_2$Cl |
| XVIII | −74.5 | —OCF$_2$CF$_2$Cl |
| XIX | −78.3 | —OCF$_2$OCF$_2$COOR R = H, CH$_3$ |
| XX | −80.2 | —OCF$_2$CF$_2$OCF$_2$COOR R = H, CH$_3$ |

With a similar procedure the functionality, composition and molecular weight of perfluoropolyoxyalkylenes of general formula (I) can be calculated, wherein the perfluoropolyether chain Rf is a structure (A), (C), (D), (E), (F), considering the various values of Chemical Shift.

The following Examples are given for illustrative and not limitative purposes of the present invention.

EXAMPLES

The perfluoropolyether mixtures used in the following Examples come from the industry when their number average functionality is between 0.8 and 1.2 or 1.80 and 1.95.

The perfluoropolyethers of said mixtures are those of formula (I) wherein Rf is the structure (B) wherein c/d=1, h=0, c, d such that the average molecular weight is that specified in the Examples; X1 is —$CF_2CH_2OH$ and Y is —$CF_2CH_2OH$ or $CF_3$ in a ratio in the mixture such as to have the average functionality specified in the Examples.

Mixtures with functionalities different from the above values have been obtained as fractions of the above mixtures by separation processes (enrichment) described in the prior art or according to the present process.

In some Examples, as a polar solvent, a perfluoropolyether has been used, commercially known as H-Galden®, of formula $HCF_2O$—$(CF_2O)_p(CF_2CF_2O)_q$—$CF_2H$, wherein p and q are integers such that the number average molecular weight is 350, and having a boiling point of about 85° C.

Example 1

Obtainment of a Mixture Having Functionality f=1.997 Starting from a Mixture with f=1.619

120 kg of silica gel, 360 kg of CFC 113, 120 kg of a mixture of monofunctional and bifunctional perfluoropolyethers with methylol functionality (Z DOL) having a functionality f=1.619 and a number average molecular weight (MW) of 1,277 are introduced in a 400 l reactor, equipped with mechanical stirring and outlet with filter, and it is left under stirring at room temperature for 2 hours.

One separates by filtration the liquid phase, which results to be formed of 175 kg of CFC 113 and 27 kg of Z DOL (MW=1,415 and f=1.220). Said fraction can therefore be used, as mentioned, in subsequent processings (see the Example 9).

In the reactor containing the adsorbing solid phase and 93 kg of Z DOL (MW=1,242; f=1.721) 180 kg of CFC 113 and 27 kg of Z DOL (MW=1,277; f=1.619) are introduced and it is left under stirring at room temperature for 2 hours.

The liquid phase is separated by filtration, which results to be formed of 170 kg of CFC 113 and 24 kg of Z DOL (MW=1,405 and f=1.280).

In the reactor containing the adsorbing solid phase and 96 kg of Z DOL (MW=1,216; f=1.789) 165 kg of CFC 113 and 24 kg of Z DOL (MW=1,230; f=1.850) are introduced and it is left under stirring at room temperature for two hours.

One separates by filtration the liquid phase, which results to be formed of 160 kg of CFC 113 and 17 kg of Z DOL (MW=1,344 and f=1.468).

In the reactor containing the adsorbing solid phase and 103 kg of Z DOL (MW=1,201; f=1.850) 180 kg of CFC 113 and 20 kg of Z DOL (MW=1,219; f=1.801) are introduced and it is left under stirring at room temperature for 2 hours.

One separates by filtration the liquid phase, which results to be formed of 230 kg of CFC 113 and 21 kg of Z DOL (MW=1,346 and f=1.522).

In the reactor containing the adsorbing solid phase and 102 kg of Z DOL (MW=1,178; f=1.900) 250 kg of CFC 113 and 19 kg of Z DOL (MW=974; f=1.970) are introduced and it is left under stirring at room temperature for two hours.

One separates by filtration the liquid phase, which results to be formed of 230 kg of CFC 113 and 19 kg of Z DOL (MW=1,322 and f=1.587).

In the reactor containing the stationary phase and 102 kg of Z DOL (MW=1,112; f=1.964) 270 kg of CFC 113 and 20 kg of Z DOL (MW=974; f=1.970) are introduced and it is left under stirring at room temperature for two hours.

One separates by filtration the liquid phase, which results to be formed of 230 kg of CFC 113 and 19 kg of Z DOL (MW=1,248 and f=1.800).

In the reactor containing the adsorbing solid phase and 103 kg of Z DOL (MW 1,061; f 1.991) 250 kg of CFC 113 and 20 kg of Z DOL (MW 1,050; f 1.990) are introduced and it is left under stirring at room temperature for two hours.

One separates by filtration the liquid phase, which results to be formed of 230 kg of CFC 113 and 22 kg of Z DOL (MW=1,210 and f=1.955).

In the reactor containing the adsorbing solid phase and 101 kg of Z DOL (MW=1,032; f=1.997) 4 extractions each with 150 kg of MeOH are carried out.

After evaporation of the methanol 96 kg of Z DOL (MW=1,032; f=1.997) are recovered with an unitary productivity per kg of adsorbing solid phase equal to 0.80.

Example 2

Obtainment of a Mixture Having f=2.0 Starting from a Mixture with f=1.990

6 kg of silica gel, 18 kg of CFC 113, 6 kg of Z DOL (MW 1,050; f=1.990) are introduced in a 30 l reactor equipped with mechanical stirring and outlet with filter and it is left under stirring at room temperature for 2 hours.

One separates by filtration the liquid phase which results to be formed of 12.3 kg of CFC 113 and 0.9 kg of Z DOL (MW=1,080 and f=1.960).

In the reactor containing the adsorbing solid phase and 5.1 kg of Z DOL (MW=1,045; f=1.995) 1 kg of Z DOL (MW=1,050; f=1.990) and CFC 113 are introduced in an amount equal to that filtered and it is left under stirring at room temperature for 2 hours.

One separates by filtration the liquid phase, which results to be formed of 11.8 kg of CFC 113 and 0.9 kg of Z DOL (MW=1,079; f=1.976).

In the reactor containing the adsorbing solid phase and 5.2 kg of Z DOL (MW=1,040; f=1.997) 0.5 kg of Z DOL (MW=1,032; f=1.997) and CFC 113 are introduced in an amount equal to that filtered and it is left under stirring at room temperature for two hours.

One separates by filtration the liquid phase, which results to be formed of 12.5 kg of CFC 113 and 0.7 kg of Z DOL (MW=1,068; f=1.987).

In the reactor containing the adsorbing solid phase and 4.9 kg of Z DOL (MW=1,035; f=2.000) 4 extractions each with 10 kg of MeOH are carried out.

After evaporation of the methanol 4.6 kg of Z DOL (MW=1,035; f=2.000) are recovered with an unitary productivity per kg of adsorbing solid phase equal to 0.77.

Example 3

Obtainment of a Mixture Having f=1.997 Starting from a Mixture with f=1.980 in the Absence of Solvent 12 kg of silica gel, 50 kg of Z DOL (MW=1,215; f 1.980) are introduced in a 100 l reactor equipped with mechanical stirring and outlet with filter, and it is left under stirring at room temperature for 2 hours.

One separates by filtration the liquid phase which results to be formed of 29.3 kg of Z DOL (MW=1,330; f=1.972).

In the reactor containing the adsorbing solid phase and 20.7 kg of Z DOL (MW=1,082; f=1.989) 30 kg of Z DOL (MW=1,240; f=1.990) are introduced and it is left under stirring at room temperature for 2 hours.

One separates by filtration the liquid phase, which results to be formed of 30.5 kg of Z DOL (MW=1,280; f=1.985).

In the reactor containing the adsorbing solid phase and 20.2 kg of Z DOL (MW=1,037; f=1.995) 10 kg of Z DOL (MW=1,210; f=1.995) are introduced and it is left under stirring at room temperature for 2 hours.

One separates by filtration the liquid phase, which results to be formed of 10.4 kg of Z DOL (MW=1,195; f=1.991).

In the reactor containing the adsorbing solid phase and 19.8 kg of Z DOL (MW=1,039; f=1.997) 4 extractions each with 20 kg of MeOH are carried out.

After evaporation of the methanol 18.5 kg of Z DOL (MW=1,039; f=1.997) are recovered with an unitary productivity per kg of adsorbing solid phase equal to 1.5.

Example 4

Obtainment of a Mixture Having f=1.996 Starting from a Mixture with f=1.980

7 kg of silica gel, 21 kg of CFC 113, 7 kg of Z DOL (MW=1,010; f 1.980) are introduced in a 30 l reactor equipped with mechanical stirring and outlet with filter, and it is left under stirring at room temperature for 2 hours.

One separates by filtration the liquid phase which results to be formed of 14.4 kg of CFC 113 and 1.1 kg of Z DOL (MW=1,129; f=1.914).

In the reactor containing the adsorbing solid phase and 5.9 kg of Z DOL (MW=990; f=1.991) 1 kg of Z DOL (MW=1,010; f=1.980) and CFC 113 are introduced in an amount equal to that filtered and it is left under stirring at room temperature for two hours.

One separates by filtration the liquid phase, which results to be formed of 13.8 kg of CFC 113 and 1.1 kg of Z DOL (MW=1,101; f=1.950).

In the reactor containing the adsorbing solid phase and 5.8 kg of Z DOL (MW=975; f=1.996) 4 extractions each with 10 kg of MeOH are carried out.

After evaporation of the methanol 5.4 kg of Z DOL (MW=975; f=1.996) are recovered with an unitary productivity per kg of adsorbing solid phase equal to 0.78.

Example 5 Comparative

Obtainment of a Mixture Having f=1.996 Starting from a Mixture with f=1.980

The following Example was carried out according to the Example 6 of U.S. Pat. No. 5,910,614.

7.7 kg of silica gel, 15.4 l of CFC 113/MeOH mixture 9/1 v/v, 7 kg of Z DOL (MW=1,010; f=1.980) are introduced in a 100 l reactor, equipped with mechanical stirring and outlet with filter and it is left under stirring at room temperature.

After 30' the solvents are distilled until obtaining a dry fine powder.

In the same reactor containing the fine powder 79 kg of CFC 113 are added and the suspension is maintained under stirring at room temperature for 2 hours.

One separates by filtration the liquid phase, which results to be formed of 72 kg of CFC 113 and 2.7 kg of Z DOL (MW=1,101; f=1.951), and on the stationary phase containing 4.3 kg of Z DOL (MW=960; f=1.996) one extraction with 17 kg of MeOH is carried out. After the methanol evaporation 3.9 kg of Z DOL (MW=960; f=1.996) are recovered with unitary productivity per kg of adsorbing solid phase equal to 0.5.

Example 6

Obtainment of a Mixture Having f=1.997 Starting from a Mixture with f=1.941 by Using H Galden® as Solvent 9 kg of silica gel, 27 kg of H Galden®, 9 kg of Z DOL (MW=990; f=1.941) are introduced in a 30 l reactor equipped with mechanical stirring and outlet with filter, and it is left under stirring at room temperature for 2 hours.

One separates by filtration the liquid phase which results to be formed of 18 kg of H Galden® and 1.4 kg of Z DOL (MW=1,250; f=1.770).

In the reactor containing the adsorbing solid phase and 7.6 kg of Z DOL (MW=955; f=1.964) 1.4 kg of Z DOL (MW=1,050; f=1.990) and H Galden® are introduced in an amount equal to that filtered and it is left under stirring at room temperature for two hours.

One separates by filtration the liquid phase, which results to be formed of 17 kg of H Galden® and 1.6 kg of Z DOL (MW=1,080; f=1.850).

In the reactor containing the adsorbing solid phase and 7.4 kg of Z DOL (MW=948; f=1.990) 1.5 kg of Z DOL (MW=1,050; f=1.990) and H Galden® are introduced in an amount equal to that filtered and it is left under stirring at room temperature for two hours.

One separates by filtration the liquid phase, which results to be formed of 17.5 kg of H Galden® and 1.5 kg of Z DOL (MW=1,070; f=1.954).

In the reactor containing the adsorbing solid phase and 7.4 kg of Z DOL (MW=943; f=1.997) 4 extractions each with 10 kg of MeOH are carried out.

After evaporation of the methanol 7 kg of Z DOL (MW=943; f=1.997) are recovered with an unitary productivity per kg of adsorbing solid phase equal to 0.78.

Example 7

Obtainment of a Mixture Having f=1.997 Starting from a Mixture with f=1.941 by Using H Galden® as Solvent and a Mixture/Silica Ratio=1/0.5 w/w 4.5 kg of silica gel, 27 kg of H Galden®, 9 kg of Z DOL (MW=990; f=1.941) are introduced in a 30 l reactor equipped with mechanical stirring and outlet with filter, and it is left under stirring at room temperature for 2 hours.

One separates by filtration the liquid phase which results to be formed of 22.5 kg of H Galden® and 4.6 kg of Z DOL (MW=1,135; f=1.901).

In the reactor containing the adsorbing solid phase and 4.4 kg of Z DOL (MW=874; f=1.973) 2 kg of Z DOL (MW=1,050; f=1.990) and H Galden® are introduced, having a boiling point equal to 85° C., in an amount equal to that filtered and it is left under stirring at room temperature for two hours.

One separates by filtration the liquid phase, which results to be formed of 21.8 kg of H Galden® and 2.1 kg of Z DOL (MW=1,070; f=1.928)

In the reactor containing the adsorbing solid phase and 4.3 kg of Z DOL (MW=865; f=1.997) 4 extractions each with 10 kg of MeOH are carried out.

After evaporation of the methanol 4.1 kg of Z DOL (MW=865; f=1.997) are recovered with an unitary productivity per kg of stationary phase equal to 0.91.

Example 8

Obtainment of a Mixture Having f=1.997 Starting from a Mixture with f=1.941 by Using H Galden® as Solvent and a Mixture/Silica Ratio=1/0.25 w/w 2.25 kg of silica gel, 27 kg of H Galden®, 9 kg of Z DOL (MW=990; f=1.941) are introduced in a 30 l reactor equipped with mechanical stirring and outlet with filter, and it is left under stirring at room temperature for 2 hours.

One separates by filtration the liquid phase which results to be formed of 24.8 kg of H Galden® and 6 kg of Z DOL (MW=1,078; f=1.915).

In the reactor containing the adsorbing solid phase and 3 kg of Z DOL (MW=851; f=1.982) 1 kg of Z DOL (MW=1, 050; f=1.990) and H Galden® are introduced, in an amount equal to that filtered and it is left under stirring at room temperature for two hours.

One separates by filtration the liquid phase, which results to be formed of 24.1 kg of H Galden® and 0.95 kg of Z DOL (MW=1,045; f=1.930).

In the reactor containing the adsorbing solid phase and 3 kg of Z DOL (MW=856; f=1.997) 4 extractions each with 10 kg of MeOH are carried out.

After evaporation of the methanol 2.9 kg of Z DOL (MW=856; f=1.997) are recovered with an unitary productivity per kg of adsorbing solid phase equal to 1.3.

Example 9

Obtainment of a Mixture Having f=1.001 Starting from a Mixture with f=1.220 by Using CFC 113 as Solvent The liquid phase filtered in the first step of the Example 1 is concentrated until obtaining a solution at 25% of Z DOL (MW=1,415; f=1.220) in CFC 113 and is fed into a 100 l reactor, equipped with mechanical stirring, heating jacket, outlet with filter and containing 13.5 kg of silica gel, leaving under stirring at room temperature for two hours.

One separates by filtration the liquid phase, indicated hereinafter as fraction A, which results to be formed of 14 kg of Z DOL (MW=1,480; f=1.072) and 65 kg of CFC 113.

The adsorbing solid phase is subjected to 4 extractions each with 10 kg of methanol, dried under vacuum at 90° C. for one hour and recovered.

From the methanol evaporation 12.7 kg of Z DOL (MW=1,351; f=1.366) are obtained.

In the same reactor the fraction A, 7 kg of the recovered silica are introduced and the mixture is left under stirring for two hours.

One separates, by filtration, the liquid phase, indicated hereinafter as fraction B, which results to be formed of 8 kg of Z DOL (MW=1,550; f=1.019) and 55 kg of CFC 113, while the stationary phase is recovered again by subjecting it to extraction with methanol according to the previously described procedure.

From the methanol evaporation 5.7 kg of Z DOL (MW=1, 359; f=1.136) are recovered.

In the same reactor the fraction B, 4 kg of the recovered silica are introduced and the mixture is left under stirring for two hours.

One separates, by filtration, the liquid phase, indicated hereinafter as fraction C, which results to be formed of 5 kg of Z DOL (MW=1,620; f=1.004) and 48 kg of CFC 113, while the stationary phase is recovered again according to the previously described procedure.

From the methanol evaporation 2.9 kg of Z DOL (MW=1, 446; f=1.041) are recovered.

In the same reactor the fraction C, 2.5 kg of the recovered silica are introduced and the mixture is left under stirring for two hours.

One separates, by filtration, the liquid phase, indicated hereinafter as fraction D, from which, after distillation of CFC 113, 3 kg of Z DOL (MW=1,620; f=1.001) are recovered.

The stationary phase is recovered according to the previously described procedure, by using 5 kg of methanol in each washing and after distillation of the methanol 2 kg of Z DOL (MW=1,620; f=1.009) are recovered.

The invention claimed is:

1. A process for separating bifunctional perfluoropolyethers having two methylol terminations —CH$_2$OH from their mixtures with monofunctional perfluoropolyethers with one methylol termination —CH$_2$OH, optionally containing perfluoropolyethers with non functionalized end groups, having general formula $$X_1\text{—O—Rf—Y} \qquad (I)$$

wherein:
  Rf is a perfluoropolyoxyalkylene chain having a number average molecular weight of 500-10,000 comprising units of (C$_2$F$_4$O), (CF$_2$O), (C$_3$F$_6$O) type, the unit (C$_3$F$_6$O) can represent units of formula —(CF$_2$CF(CF$_3$)O) or —(CF(CF$_3$)CF$_2$O); —(CF$_2$(CF$_2$)$_z$CF$_2$O) wherein z is an integer equal to 1 or 2; —CR$_4$R$_5$CF$_2$CF$_2$O— wherein R$_4$ and R$_5$ are equal to or different from each other and selected from H, Cl or perfluoroalkyl, said units being statistically distributed along the chain;
  X$_1$ and Y are end groups selected from —CFXCH$_2$OH (wherein X is F or CF$_3$), —CF$_3$, —CF$_2$Cl, —CF$_2$CF$_2$Cl, —C$_3$F$_6$Cl, —CF$_2$Br, —CF$_2$CF$_3$, wherein at least one of the two end groups is —CFXCH$_2$OH,
comprising the following steps:
a) addition of the perfluoropolyether mixture to an adsorbing solid phase, optionally dispersed in an apolar solvent, contained in a reactor equipped with stirring, with a mixture/solid phase ratio from 0.1 to 10 w/w, leaving under stirring for a time between 15 minutes and 6 hours at a temperature between 10° and 150° C.;
b) filtration of the mixture obtained from step a), with separation of a solid phase containing adsorbed perfluoropolyether mixture enriched in bifunctional perfluoropolyethers and a liquid containing a perfluoropolyether mixture having diminished bifunctional species;
c) addition to the solid phase obtained in b), of a perfluoropolyether mixture having an average functionality higher than that of the perfluoropolyether mixture of the liquid obtained in b), in a mixture/solid phase ratio between 0.1 and 2 w/w, optionally together with an apolar solvent, leaving under stirring for a time between 15 minutes and 6 hours, at a temperature between 10° and 150° C.;

c1) optional repetitions of the operations of steps b) and c), until reaching the desired high functionality of the adsorbed perfluoropolyether;

c2) filtration to separate the adsorbing solid phase from the liquid;

d) addition to the solid phase separated in c2) containing adsorbed the perfluoropolyether having the desired high functionality, of a polar solvent in an amount of 1-10 w/w, stirring at 5°-150° C.;

e) filtration of the mixture resulting from step d) with separation of a liquid containing the perfluoropolyether having the desired high functionality which is then isolated from the solvent.

2. A process according to claim 1 wherein the perfluoropolyether chain Rf contains at least one of the following repeating units:

   (A)

wherein X is F or $CF_3$; a and b are integers such that the number average molecular weight is in the above range; a/b is between 10 and 100; or the repeating units in (A) can be linked as follows —$(CF_2CF(CF_3)O)_a$ $(CFXO)_b$—$CF_2(R'f)CF_2$—O—$(CF_2CF(CF_3)O)_a$ $(CFXO)_b$— wherein R'f is a fluoroalkylene group from 1 to 4 C atoms;

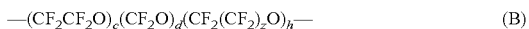   (B)

wherein c, d and h are integers such that the number average molecular weight is in the above range; c/d is between 0.1 and 10; h/(c+d) is between 0 and 0.05, z is 2 or 3; h can also be equal to 0;

   (C)

wherein X is F or $CF_3$; e, f, g are integers such that the number average molecular weight is in the above range; e/(f+g) is between 0.1 and 10, f/g is between 2 and 10; ($C_3F_6O$) can represent units of formula —$(CF_2CF(CF_3)O)$;

—$(CF_2(CF_2)_zO)_s$—   (D)

wherein s is an integer that gives the above number average molecular weight, z has the already defined meaning;

   (E)

wherein $R_4$ and $R_5$ are equal to or different from each other and selected from H, Cl or perfluoroakyl from 1 to 4 C atoms; R'f is a perfluoroalkylene group from 1 to 4 C atoms; j', p' and q' are integers that give a number average molecular weight as that above indicated;

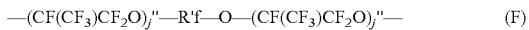   (F)

j″ being an integer that gives the above number average molecular weight; R'f is a fluoroalkylene group from 1 to 4 C atoms.

3. A process according to claim 1, wherein the Rf chain contains the structure (A) or (B).

4. A process according to claim 1, wherein in step a) the adsorbing solid phase is selected from active alumina, silica gel, magnesium oxide, Al and Mg silicates.

5. A process according to claim 4, wherein the adsorbing solid phase has an average pore diameter lower than 200 Å.

6. A process according to claim 1, wherein the adsorbing solid phase is the silica gel with porosity from 60 to 100 Å.

7. A process according to claim 1, wherein in step a) the apolar solvent is a fluorocarbon or a hydrofluoropolyether, and the maximum temperature in the step is the boiling temperature of the solvent.

8. A process according to claim 7, wherein the apolar solvent is selected from CFC 113, bis- (trifluoromethyl) benzene, H-Galden®.

9. A process according to claim 7, wherein the apolar solvent is used in a solvent/solid phase ratio from 0 to 10 w/w.

10. A process according to claim 1, wherein in step c) a perfluoropolyether mixture is added having a functionality higher than that of the mixture added in step a).

11. A process according to claim 1, wherein the apolar solvent in step c) is the same solvent used in step a) and is used in the same ratios and at the same temperatures indicated in step a).

12. A process according to claim 1, wherein in step d) the polar solvent is selected from the group formed of ketones, esters, alcohols, or their mixtures with lower amounts of apolar solvents; the maximum temperature is the boiling temperature of the solvent or of the mixture.

13. A process according to claim 1, wherein the liquids separated in the filtrations b), c1) or c2) are joined and the mixture of the aforesaid filtered liquids is treated in the following steps:

a1) addition to said mixture rich in monofunctional perfluoropolyethers, optionally containing perfluoropolyethers with non functionalized end groups, of a fresh adsorbing solid phase in order to absorb on said solid phase the bifunctional perfluoropolyethers;

b1) filtration of the mixture obtained in a1) with separation of a liquid enriched in monofunctional perfluoropolyethers, optionally containing perfluoropolyethers with non functionalized end groups;

optionally repeating several times steps a1) and b1) until obtaining a filtered liquid formed of a mixture of monofunctional perfluoropolyethers with a functionality close to 1, optionally containing perfluoropolyethers with non functional end groups, using in each new step a1) a fresh adsorbing solid phase and the liquid separated in the previous step b1).

14. A process according to claim 8, wherein the apolar solvent is CFC 113.

15. A process according to claim 12, wherein the polar solvent is methanol.

16. A process according to claim 13, wherein the fresh adsorbing solid phase is silica.

* * * * *